(No. Model.)
3 Sheets—Sheet 1.
C. F. PIKE.
APPARATUS FOR TREATING PLACER DIRT IN RECOVERING PRECIOUS METALS.
No. 581,036.
Patented Apr. 20, 1897.
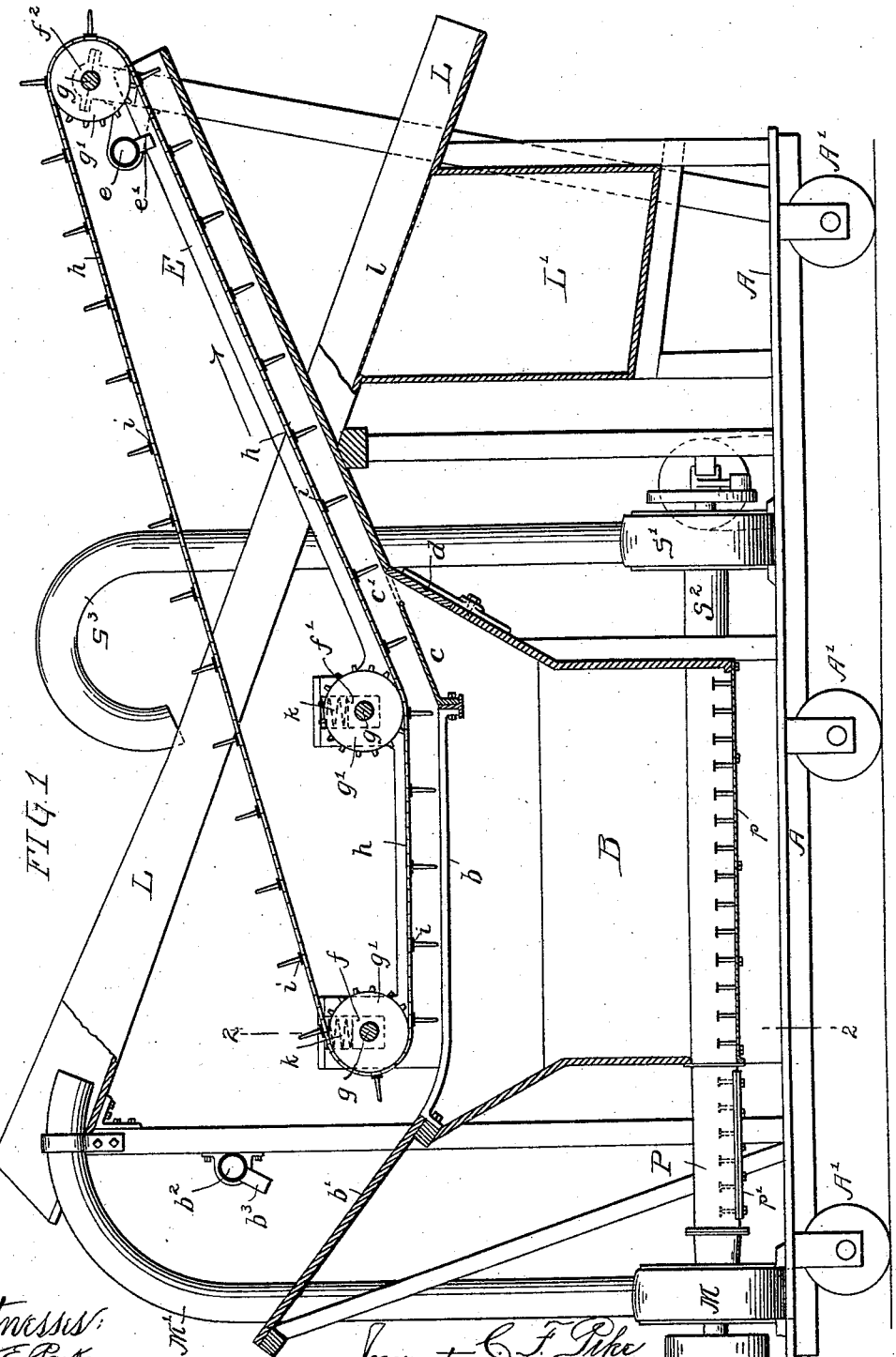

(No Model.) 3 Sheets—Sheet 2.
C. F. PIKE.
APPARATUS FOR TREATING PLACER DIRT IN RECOVERING PRECIOUS METALS.
No. 581,036. Patented Apr. 20, 1897.
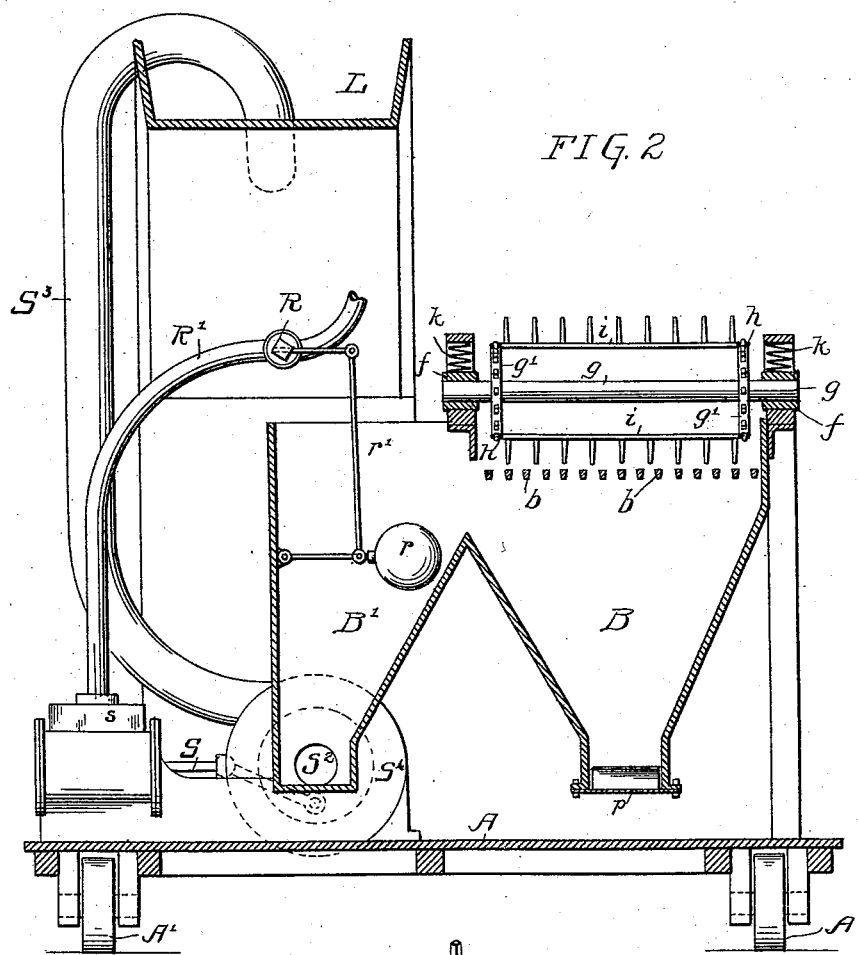
 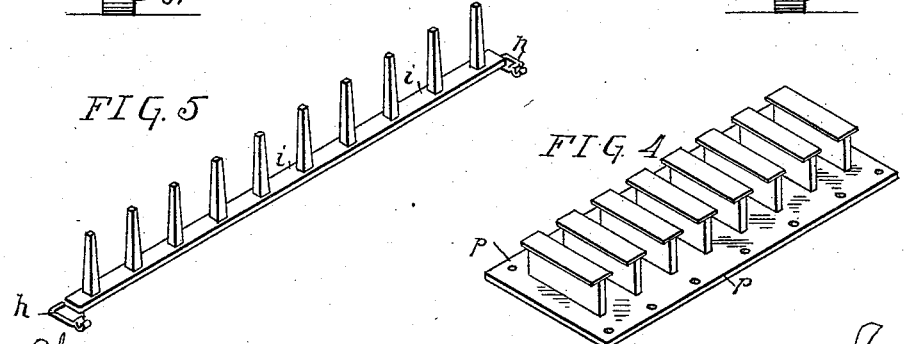
Witnesses: Inventor:
Charles F. Pike,
by his Attorney, (No Model.) 3 Sheets—Sheet 3.
C. F. PIKE.
APPARATUS FOR TREATING PLACER DIRT IN RECOVERING PRECIOUS METALS.
No. 581,036. Patented Apr. 20, 1897.
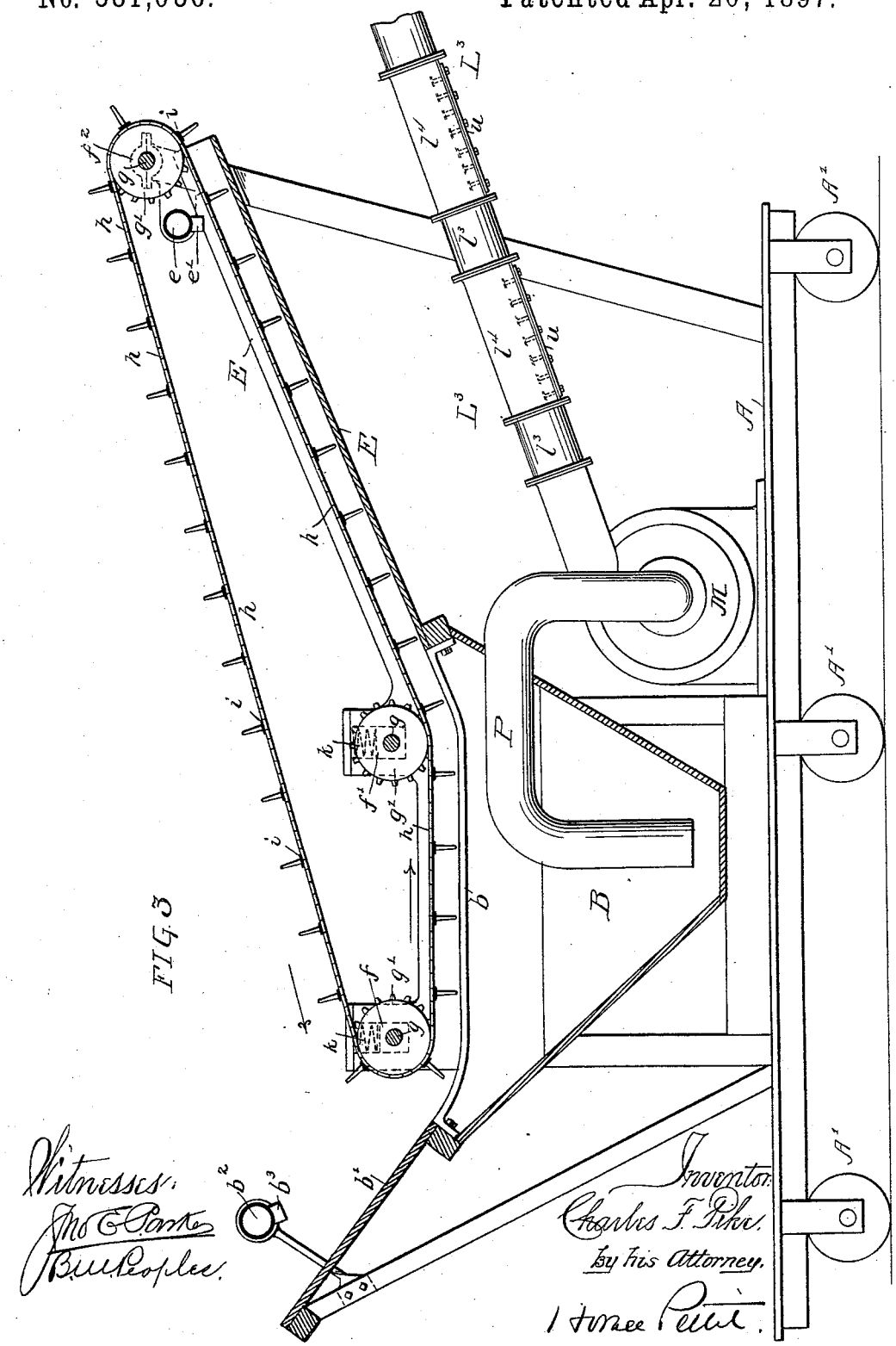

UNITED STATES PATENT OFFICE.

CHARLES F. PIKE, OF PHILADELPHIA, PENNSYLVANIA.

APPARATUS FOR TREATING PLACER-DIRT IN RECOVERING PRECIOUS METALS.

SPECIFICATION forming part of Letters Patent No. 581,036, dated April 20, 1897.

Application filed December 16, 1896. Serial No. 615,856. (No model.)

*To all whom it may concern:*

Be it known that I, CHARLES F. PIKE, a citizen of the United States, and a resident of the city of Philadelphia, State of Pennsylvania, have invented certain new and useful Improvements in Apparatus for Treating Placer-Dirt in the Recovery of Precious Metals, of which the following is a full, clear, and exact description, reference being had to the accompanying drawings, forming part of this specification.

My invention relates to certain improvements in the construction of apparatus for the separation of fine dirt and metal from placer-gravel, its object being to so operate upon the placer-gravel that all of the heavy rocks and larger stones will be thoroughly and completely washed by the use of a minimum quantity of water and freed from soil and clay, the coarse matter being then thrown away and the finer portions saved to be subsequently treated for the recovery of the contained precious metal.

One of the great difficulties to be met in placer-mining districts is the scarcity of water.

One of the main objects of my invention is to provide an apparatus for subjecting the gold-bearing material to the most complete washing with a minimum quantity of water, securing the greatest possible results from a given quantity of water.

In the material which I more particularly desire to act upon the gold is found in the form of fine metallic particles adhering with the soil and clay to gravel and larger rocks and stones, and it requires a very thorough and violent washing to dissolve the soil and clay and free the particles of gold. I have found in practice that the ordinary washing of this gold-bearing material by directing a jet or stream or a series of jets or streams of water against it is not sufficient to effect the thorough washing necessary to work upon a commercial basis. I have, however, found that the desired result may be accomplished by subjecting the material to constant contact with a stream of running water in such manner that the water will be agitated and continually thrown against the rocks and stones from all sides, the series of contacts with the partly-divided stream of water gradually wearing away the adhering soil and clay from the stone until the washing is complete and the stones pass from the water perfectly free and clean.

A further difficulty found in the treatment of the gold-bearing material in sluice-boxes is that the nature of the ground often prevents the construction of a sluice with a sufficient pitch or inclination to effect the rapid flow of the water and the placer-dirt, the dissolved clay forming a thick heavy mass which will accumulate and will not flow freely unless the sluice is inclined to a considerable extent. To overcome this objection, I employ a sluice-box inclined at any desired angle and provide for the flow of the material by forcing it under the action of a pump, injector, or similar device to give to the material an initial speed or force which will carry it through a sluice-box inclined at a very slight angle and at a speed which it could not otherwise accumulate through the force of gravity unless the angle of the sluice-box were greatly increased.

A further object of my invention is to provide for the preliminary separation of the finer particles from the large stones and rocks and the storage of such material in a suitable tank or vessel, from which it is afterward forced to be further separated by the action of riffles or equivalent devices, the construction of apparatus permitting the employment of a preliminary separator at a short distance above the level of the ground, so that the placer-dirt to be treated will not have to be raised to any considerable height.

My invention further contemplates the employment of riffles in the pump or injector supply and discharge pipes, and in the bottom of the preliminary storage-tank, and involves further features of construction and operation, as more specifically set forth hereinafter.

It will be clear from a careful reading of the description that one of the essential characteristics of my invention to a successful practical treatment of the ore in commercial quantities is the construction which enables not only the thorough washing of the material, but the regular, steady, continuous operation whereby a continuous operation is kept up from the time that the crude material is placed upon the receiving-platform until it leaves the sluice without the necessity, as in other constructions, of passing the same material over and over again through the same machine, my construction of apparatus being such that the material is thoroughly washed in a single passage through the machine. In this construction a maximum quantity of gold is obtained from the ore, and by the steady continuous operation a greater quantity of material can be treated commercially than in any other apparatus at present known for treating placer-dirt in a given time. The essential features and parts of the apparatus are so connected and related to each other as to uniformly coöperate in performing their respective functions in receiving, treating, and discharging the material at the proper time, so as to complete and perfect the continuous operation of the machine.

In the accompanying drawings, Figure 1 is a longitudinal sectional elevation, partly on the line 1 1, Fig. 2, of an apparatus for the treatment of placer-gravel constructed in accordance with my invention. Fig. 2 is a transverse sectional elevation of the same on the line 2 2, Fig. 1. Fig. 3 is a view similar to Fig. 1, illustrating a modified construction; and Figs. 4 and 5 are detached perspective views of details of construction of the apparatus.

To treat placer-gravel succesfully on a commercial scale, especially where the material is not extremely rich and where the gold recovered is in fine particles, it is necessary that all the gravel treated should be very thoroughly and completely washed and all the fine material saved for subsequent treatment, and at the same time the separating and washing apparatus must be in the immediate vicinity of the material to be acted upon in order that the expense of cartage or carrying may be avoided.

In carrying out my invention I place the separating and washing apparatus, and preferably a scoop, shovel, or endless carrier, or equivalent digging or ditching device, on a wheeled platform and travel the same toward and through the bank of placer-gravel to be operated upon. The digging mechanism (not shown in the drawings) may be of any desired character, and is placed at the front of the platform and gradually digs its way into or through the bank, lifting the dirt gradually and continuously and depositing it on a platform, from whence it is carried by a toothed conveyer over a series of separating-bars and through a body of moving water, effecting a very thorough and complete washing of the larger stones or rocks, which are always found in placer deposits. The larger stones or rocks after being washed are thrown to the rear of the platform, so as not to interfere with the advancement of the work, while the finer material is saved to be subsequently treated for the recovery of its contained gold.

Referring to the drawings, A represents a platform mounted on a series of wheels A' and carrying the various parts of the apparatus. Near the foward end of the platform is a tank B, over the top of which extends a screening device preferably constructed of a series of horizontal bars or slats $b$, separated from each other for a distance sufficient to permit the passage of small stones and all of the soil, clay, and gold which may be washed from the larger stones and rocks. The screening device may be constructed of woven wire or perforated plates. The forward ends of the bars $b$ are connected to a platform $b'$, on which the placer-dirt to be treated is deposited, the platform being inclined, so that the material will slide down onto the bars to be separated. Immediately above the platform is a water-supply pipe $b^2$, provided with a series of nozzles $b^3$, for the purpose of producing a series of streams of water directed against the material to be treated to effect a preliminary washing and to aid in traveling the material along the inclined platform. At the opposite side of the box or tank B and communicating therewith is a wash-trough E, inclined upwardly toward the rear of the machine, and near its upper end is a water-supply pipe $e$, preferably provided with a series of nozzles $e'$, to direct the discharge of the water in a nearly-uniform manner throughout the width of the trough. The lower end of the wash-trough E communicates with the inclined side of the tank B, and between the ends of the bars $b$ and the juncture of the trough and tank is a plate $c$, extending for a portion of the distance and leaving an open space $c'$, through which any material washed by the stream of running water down the wash-trough may pass into the tank B. At this point there is some danger of clogging by the accumulation of stones or rocks too large to pass through the opening $c'$, and to provide for the removal of this material I may employ a removable plate or door $d$, or, as shown by dotted lines in Fig. 1, this opening may be covered by a series of slatted bars, which will prevent the accumulation of stones or rocks. In the construction shown in Fig. 3 the bars $b$ are continuous from the lower edge of the receiving-platform to the lower end of the wash-trough, and all material washed down the trough will fall through the spaces between the bars into the tank B.

In suitable bearings $f$ $f'$ $f^2$ are mounted shafts $g$, carrying sprocket-wheels $g'$, over which pass link belts $h$, carrying at intervals toothed bars $i$, the belts being so mounted and guided that the toothed bars will engage with the material to be treated as it reaches the lower end of the receiving-platform and will travel all of the rocks and stones too large to pass between the bars $b$ over said bars and thence up through the wash-trough E in contact with a stream of water running down the trough, the stones being brought into contact with the water, and the latter by contact with the stones and with the toothed bars being divided and subdivided into minute streams or currents which are forced into contact with the rocks from all sides, the rocks being turned and moved by the teeth, so that a thorough and complete washing is effected and all of the adhering soil and clay is separated and washed down into the receiving-tank, while the stones and rocks are carried up to the end of the wash-trough and fall from the top of the same to a point beyond the rear of the carrying-platform.

In some cases stones or rocks will be thrown on the platform of such size that they cannot pass between the surface of the bars and the link belts $h$, and in order to prevent any breakage or straining the bearings $f f'$ are in the form of guided blocks acted upon by the springs $k$, which will normally hold the carrying-shafts in the position illustrated in the drawings, but which will yield if a large rock is caught, and thus prevent any breakage. The same result may also be effected by arranging the bars $b$ on springs, so that they may yield in the same manner.

At one side of the wash-trough is a sluice-box L, inclined at any angle desired and provided near its lower end with a perforated plate $l$, through which the finer material and gold fall into a collecting-box L', the remaining material and the water passing off at the end of the sluice-box to a point beyond the rear of the apparatus. The sluice-box is of any desired construction and may or may not be provided with riffle-plates or other collecting devices, and its degree of inclination will be altogether dependent upon the required point of discharge.

The bottom of the tank B is connected to a pump or injector M, from which extends a pipe M', extending into the upper end of the sluice-box, the pump or injector collecting the water, small stones, and clay, or soil from the tank and discharging it into the sluice-box from the end of the pipe M' with such velocity that the material will be traveled down the sluice-box without regard to the degree of inclination of the latter. The sluice-box ordinarily must be inclined at a considerable angle in order that the thick heavy clay, black sand, and stones will be carried by the water toward its lower discharge end, and when the supply of water is limited the sluice-box must be inclined at a much greater angle. In the present case the discharge of the material into the sluice-box by the pump or injector gives the material an initial velocity which will carry it from end to end of a sluice-box nearly level, and the material cannot accumulate in the box. This construction is found desirable where, owing to the nature of the ground, the sluice-box cannot be given a sufficient angle to enable the material to acquire a velocity sufficient to carry it along.

The sides of the tank B converge toward the bottom, as illustrated more clearly in Fig. 2, and the bottom is preferably formed by a removable riffle-plate $p$, in which gold may be retained, the plate being removed from time to time and cleaned, and in the suction-pipe P, leading from the bottom of the tank to the pump or injector, is also placed a removable riffle-plate $p'$, the pipe being preferably square in cross-section and having a removable bottom, as shown in Fig. 4, in the form of a riffle-plate. It will be seen that the plates in the bottom of the tank and in the bottom of the suction-pipe may be readily taken off and clean plates substituted without stopping the operation except for a few minutes.

In practice I have found that when a large quantity of material is placed on the receiving-platform $b'$ the greater part of it, if fine, will almost immediately fall through the spaces of the screen and the tank will at times overflow. To remedy this and save the material which might otherwise be wasted, I provide an overflow-tank B' at one side of the tank B, as shown in Fig. 2, the partition between the tanks being lower than the side walls of either tank, so that any overflow from the tank B will pass into the tank B'. In the tank B' is placed a float $r$, connected by a rod $r'$ to a valve R on a steam-supply pipe R', extending from the boiler to the steam-chest $s$ of a steam-engine S. The engine is connected to a rotary pump S', connected by a suction-pipe $S^2$ to the lower end of the overflow-tank B' and by a discharge-pipe $S^3$ to the sluice-box L, so that when the amount of overflow is sufficient to raise the ball-float $r$ the latter will in rising turn the valve R, permitting the passage of steam through the pipe R' to the steam-engine, and the latter will then operate the pump to discharge the material through the pipe $S^3$ into the sluice-box, the operation ceasing automatically when the float descends and cuts off the steam-supply.

It will be understood that the forcing mechanism may be of any desired character, the rotary pumps shown being preferred, although I may employ either a single or double acting pump or injectors or other elevating devices, as desired.

In some instances the riffle-plates at the bottom of the tank may be dispensed with, and the suction-pipe of the pump may dip into the tank, as shown in Fig. 3.

In some cases where the bed-rock is in ridges much difficulty is experienced in discharging the water and debris at a point where it will not interfere with the operation of the mechanism, and to overcome this objection I may employ in lieu of the sluice-box illustrated in Fig. 1 a pipe-sluice of the character shown in Fig. 3.

In Fig. 3 the various parts of the apparatus, with the exception of the sluice-box, are substantially the same as previously described; but in this case I employ an upwardly-inclined pipe-sluice L³, which may be round, square, or of other form in cross-section, but is preferably formed of a series of alternately round and square sections l³ l⁴, respectively, the ends of the sections being flanged, so that they may be bolted together, and the length of the sluice-pipe increased to any desired extent to effect the discharge of the water and debris at any convenient point. The bottom of each square section is removable, being in the form of flat plate u, provided with riffles, which may be of the character illustrated in Fig. 4 or any known construction, the plates being removable, so that when filled or clogged they may be replaced by fresh plates without any lengthy stop in the operation of the apparatus.

In connection with the construction of tank and wash-trough herein illustrated and described I may employ in lieu of the traveling belts and toothed bars illustrated a slatted grizzly—such, for instance, as that illustrated in application for United States Letters Patent filed by me on November 20, 1896, under Serial No. 612,888—in which case the bars b at the top of the tanks may be dispensed with.

Having thus described my invention, what I claim, and desire to secure by Letters Patent, is—

1. The combination of the inclined sluice-box, a receiving-tank, a pipe or conduit leading from the tank to the sluice-box, mechanism for forcing the contents of the tank to the sluice-box, an inclined wash-trough in communication with the tank, an endless-chain carrier for traveling the ore up through the wash-trough for contact with a body of moving water contained therein, the washings and washing-water being accumulated in the tank and portions to be subsequently treated and thence discharged to the elevated sluice-box, substantially as specified.

2. In an ore-treating apparatus, a tank, a sluice, a pipe or conduit connecting the bottom of said tank with said sluice, and mechanism for discharging material from the tank through said pipe into said sluice, an inclined wash-trough communicating with said tank and mechanism for traveling the ore to be treated up through said wash-trough in contact with the water therein, substantially as described.

3. In an apparatus for treating placer-dirt, a receiving-tank for receiving the washed gold and disintegrated gold-bearing material, a screening device mounted above said tank, an inclined sluice, a pipe connecting the bottom of the tank with said sluice, a pump or injector for discharging the contents of the tank through said pipe into said sluice, and means for washing the ore before it passes through the screening device and for conveying away the disintegrated refuse material, substantially as described.

4. In an apparatus for treating placer-dirt, a receiving-tank for receiving the washed gold and disintegrated gold-bearing material, a screening device, a water-supply, an inclined sluice, a pipe connecting the bottom of said tank with said sluice, a pump or injector for discharging the larger portion of the contents of the tank through said pipe into said sluice, substantially as described.

5. The combination of the inclined sluice-box, a receiving-tank on a level below the sluice-box, a pipe or conduit leading from the tank to the sluice-box, mechanism for forcing the contents of the tank to the sluice-box, a wash-trough, an endless-chain carrier for traveling the ore up through the wash-trough, an overflow-tank in communication with the receiving-tank, a pipe extending from the overflow-tank to the sluice-box, and mechanism for automatically regulating the discharge of the contents of the overflow-tank to said sluice-box, substantially as specified.

6. The combination of mechanism for separating and washing placer-gravel, a tank for collecting the water and the material to be treated, an elevated sluice-box, a pump, a suction-pipe leading from the tank to the pump, a removable riffle-plate in the bottom of said suction-pipe, and a discharge-pipe leading from the pump to the elevated sluice-box.

7. The combination with the separating mechanism, of a receiving-tank, an elevated sluice-box, mechanism for discharging the contents of the tank into the sluice-box, an overflow-tank at one side of the receiving-tank, a pump or injector for discharging the contents of the overflow-tank, a steam-supply pipe leading to said pump or injector, and a float in the overflow-tank, said float being operatively connected to the valve of the steam-supply pipe.

8. In an apparatus for treating placer-ore, a tank, B, overflow-tank, B', screening-surface, b', inclined wash-trough, E, sluice, L, pump, M, communicating with the bottom of the tank, and pipe, M', leading to the upper end of the sluice, L, water-supply, e, endless conveyer, h, carried on sprocket-wheels, g', over said screening-surface and through said trough, the whole supported upon a movable platform and trucks, substantially as specified.

In witness whereof I have hereunto set my hand this 14th day of December, A. D. 1896.

CHARLES F. PIKE.

Witnesses:
 EDMUND S. MILLS,
 JNO. E. PARKER.